(12) United States Patent
Montena

(10) Patent No.: US 6,979,133 B2
(45) Date of Patent: Dec. 27, 2005

(54) EPOXY BONDED FIBER OPTIC CONNECTOR AND METHOD OF CONSTRUCTING SAME

(75) Inventor: Noah Montena, Syracuse, NY (US)

(73) Assignee: John Mezzalingua Associates, Inc., East Syracuse, NY (US)

( * ) Notice: Subject to any disclaimer, the term of this patent is extended or adjusted under 35 U.S.C. 154(b) by 24 days.

(21) Appl. No.: 10/764,844

(22) Filed: Jan. 26, 2004

(65) Prior Publication Data

US 2005/0163432 A1 Jul. 28, 2005

(51) Int. Cl.[7] ................................................. G02B 6/36
(52) U.S. Cl. ............................ 385/80; 385/76; 385/81
(58) Field of Search ........................ 385/76–78, 80–87; 439/578

(56) References Cited

U.S. PATENT DOCUMENTS 6,331,080 B1 * 12/2001 Cole et al. ..................... 385/80
6,884,113 B1 * 4/2005 Montena ..................... 439/578

* cited by examiner

*Primary Examiner*—Phan T. H. Palmer
(74) *Attorney, Agent, or Firm*—Wall Marjama & Bilinski LLP

(57) ABSTRACT

A connector for releasable engagement of a fiberoptic cable with a port on a piece of compatible equipment includes a body of generally cylindrical form which includes a cavity. After a prepared cable end of the fiberoptic cable is inserted through a driving structure and registered against a seal, and the combination placed in a pre-form mold, an epoxy material is flowed into the mold to surround portions of the prepared cable end, thereby creating an assembly consisting of the prepared cable end, the seal, and the hardened epoxy material. The assembly is then disposed inside the cavity of the body after which the assembly is secured to the body using a nut or compression fitting.

12 Claims, 5 Drawing Sheets

EPOXY BONDED FIBER OPTIC CONNECTOR AND METHOD OF CONSTRUCTING SAME

FIELD OF THE INVENTION

This invention relates generally to the field of connectors for coupling fiber optic cables to an equipment port, and more particularly to a fiber optic connector with epoxy bonding and sealing the connector to the fiber optic cable.

BACKGROUND OF THE INVENTION

Connectors used to secure the strength members and jacket of a fiber optic cable to an equipment port with a load-bearing, weather-tight connection while allowing the signal-carrying fibers of the cable to pass into the equipment housing are known. One type of prior art design of such connectors uses specially sized mechanical clamps to secure the cable to the connector and heat-shrink tubing to secure the break-out tubing to the cable. Because of the wide range of available trunk cables specified by customers, a large number of different clamps must be stocked to fit all cable sizes, leading to inventory and delivery problems. In addition, such clamps grip only the polyethylene outer jacket of the cable rather than gripping the strength members directly, thus limiting the amount of tension the connection can bear. Furthermore, the heat shrink process is labor intensive, resulting in bulky cables with a limited number of break-out tubes that fit inside the connector.

SUMMARY OF THE INVENTION

Briefly stated, a connector for releasable engagement of a fiberoptic cable with a port on a piece of compatible equipment includes a body of generally cylindrical form which includes a cavity. After a prepared cable end of the fiberoptic cable is inserted through a driving structure and registered against a seal, and the combination placed in a pre-form mold, an epoxy material is flowed into the mold to surround portions of the prepared cable end, thereby creating an assembly consisting of the prepared cable end, the seal, and the hardened epoxy material. The assembly is then disposed inside the cavity of the body after which the assembly is secured to the body using a nut or compression fitting.

According to an embodiment of the invention, a connector device for securing a fiberoptic cable, which cable includes a cable sheath, inner sheathing, and a plurality of break-out tubes, to an equipment port, includes a body of generally cylindrical form having a first section with an inner diameter and a connection portion at a first end of the body; a seal in the body at a second end of the body defining a cavity between the seal and the connection portion, the seal having an outer diameter slightly greater than the inner diameter of the body such that a compression fit is formed between the seal and the body; a shoulder disposed on an inner surface of the seal such that the cable sheath abuts the shoulder; an epoxy material in the cavity surrounding portions of the inner sheathing and the plurality of break-out tubes disposed inside the cavity; and driving means, connected to the second section of the body, for driving the seal into the body.

According to an embodiment of the invention, a method of assembling a connector for mounting a fiberoptic cable to an equipment port, wherein a prepared end of the cable includes a jacket, inner sheathing inside the jacket and extending beyond the jacket, and a plurality of break-out tubes inside the inner sheathing and extending beyond the inner sheathing, includes the steps of (a) providing a body having a first end connectable to an equipment port and a second end opposite the first end, wherein the body includes a cavity formed therein; (b) inserting the prepared end of the cable through a seal; (c) registering the cable sheath against a shoulder of the seal; (d) disposing the combined seal and at least a portion of the prepared cable end into a pre-form mold; (e) flowing an epoxy material into the pre-form mold and permitting the epoxy material to harden; (f) removing an assembly consisting of the seal, the portion of the prepared cable end, and the hardened epoxy material from the pre-form mold; (g) disposing the assembly through a second end of the body into the cavity; and (h) securing the assembly in the body.

According to an embodiment of the invention, a method of assembling a connector for mounting a fiberoptic cable to an equipment port, wherein a prepared end of the cable includes a jacket, inner sheathing inside the jacket and extending beyond the jacket, and a plurality of break-out tubes inside the inner sheathing and extending beyond the inner sheathing, includes the steps of (a) providing a body having a first end connectable to an equipment port and a second end opposite the first end, wherein the body includes a cavity formed therein; (b) mounting a seal within the second end of the body; (c) inserting the prepared end of the cable through the seal such that the inner sheathing is contained within the cavity; (d) registering the cable sheath against a shoulder of the seal; (e) forcing the seal a predetermined distance into the body, whereby the prepared end of the cable is properly positioned within the body; and (f) injecting an epoxy material in flowable form through the first end of the body to fill at least a portion of the cavity and covering all of the inner sheathing in the prepared cable end and a portion of the plurality of break-out tubes in the prepared cable end, wherein the cable is bonded to the connector when the epoxy material hardens.

DETAILED DESCRIPTION OF THE PREFERRED EMBODIMENT

Figure 1:
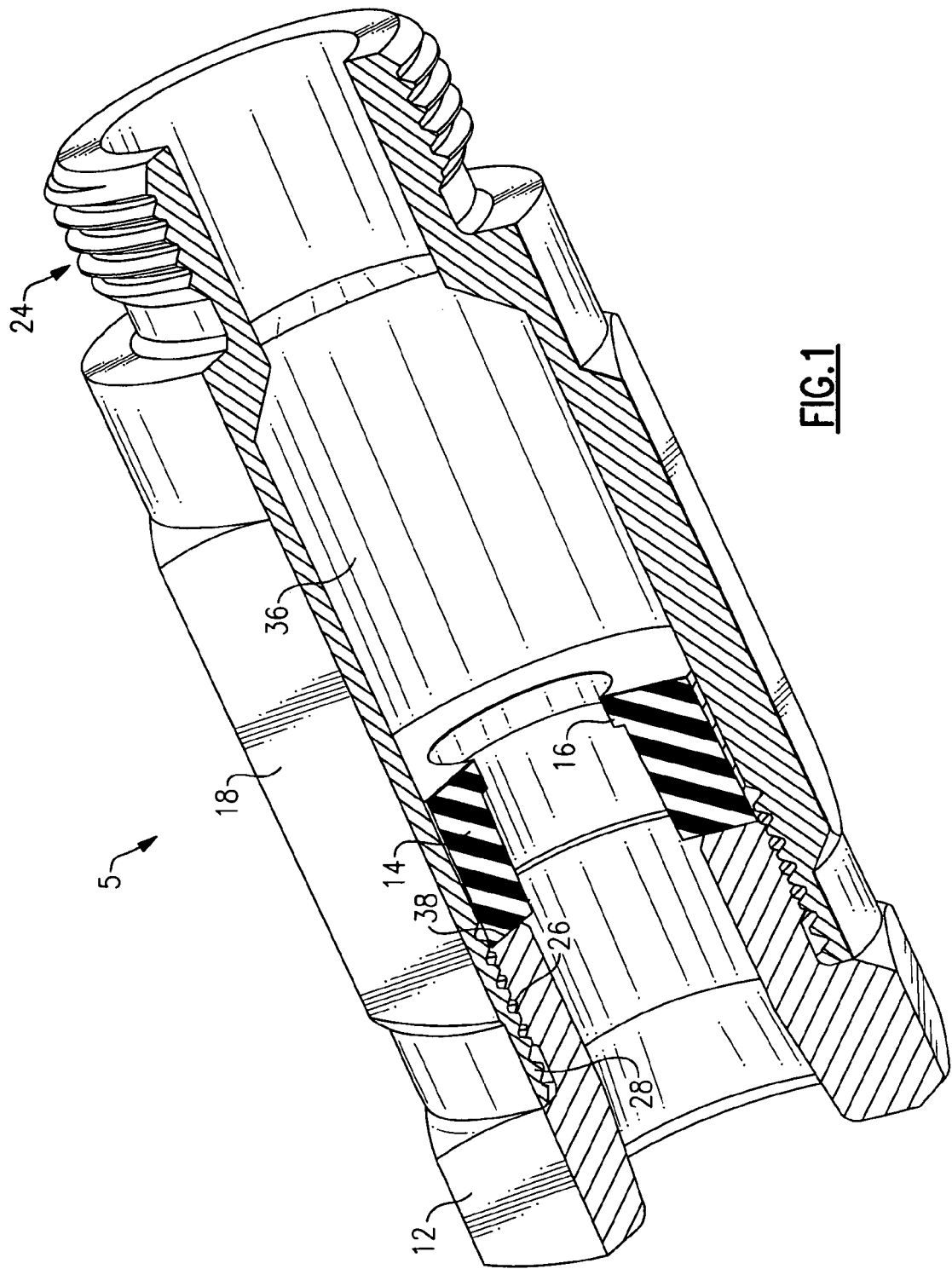
FIG. 1 shows a perspective cutaway view of an embodiment of the invention.
Figure 2:
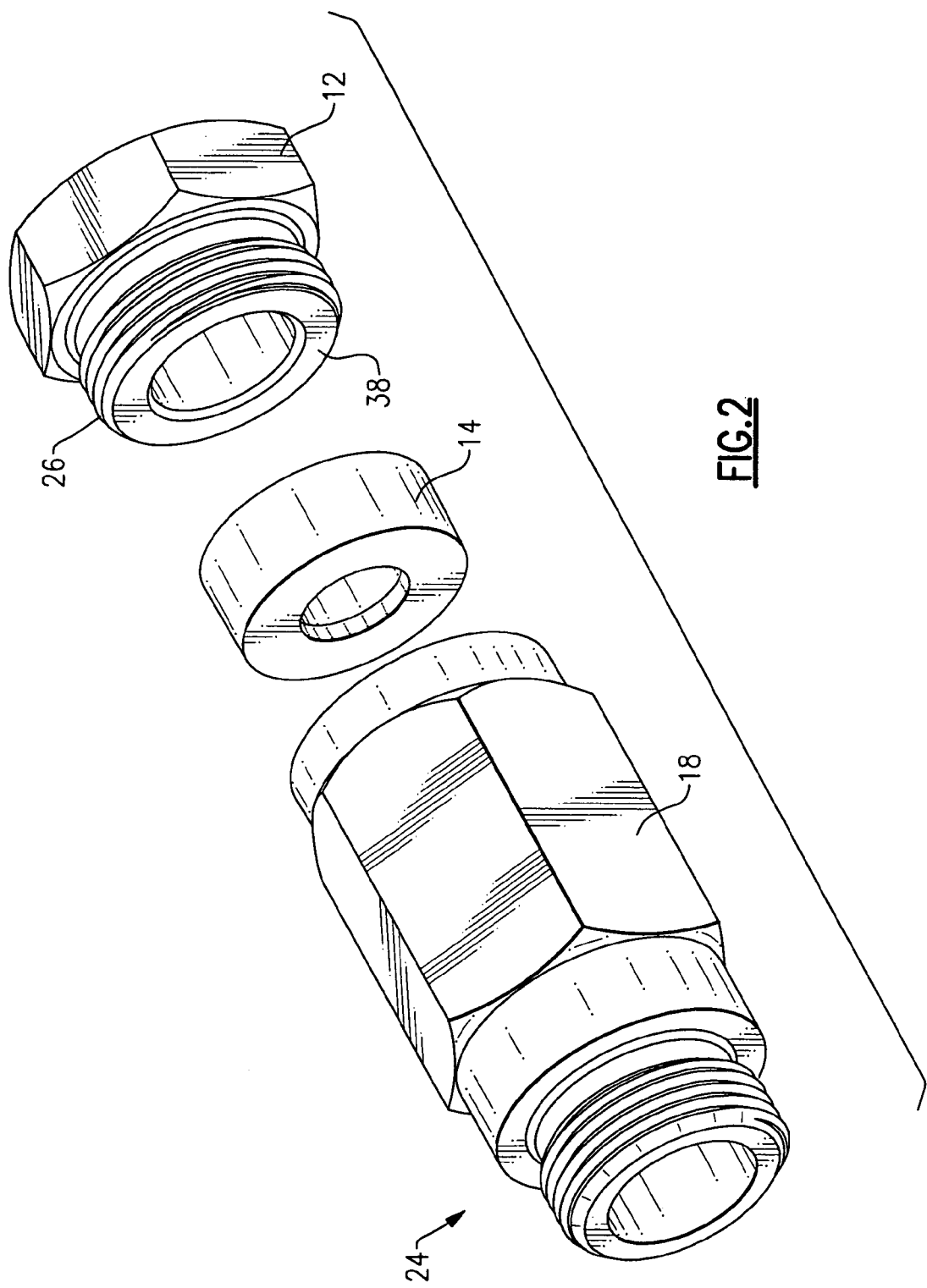
FIG. 2 shows an exploded perspective view of the embodiment of FIG. 1.
Figure 3:
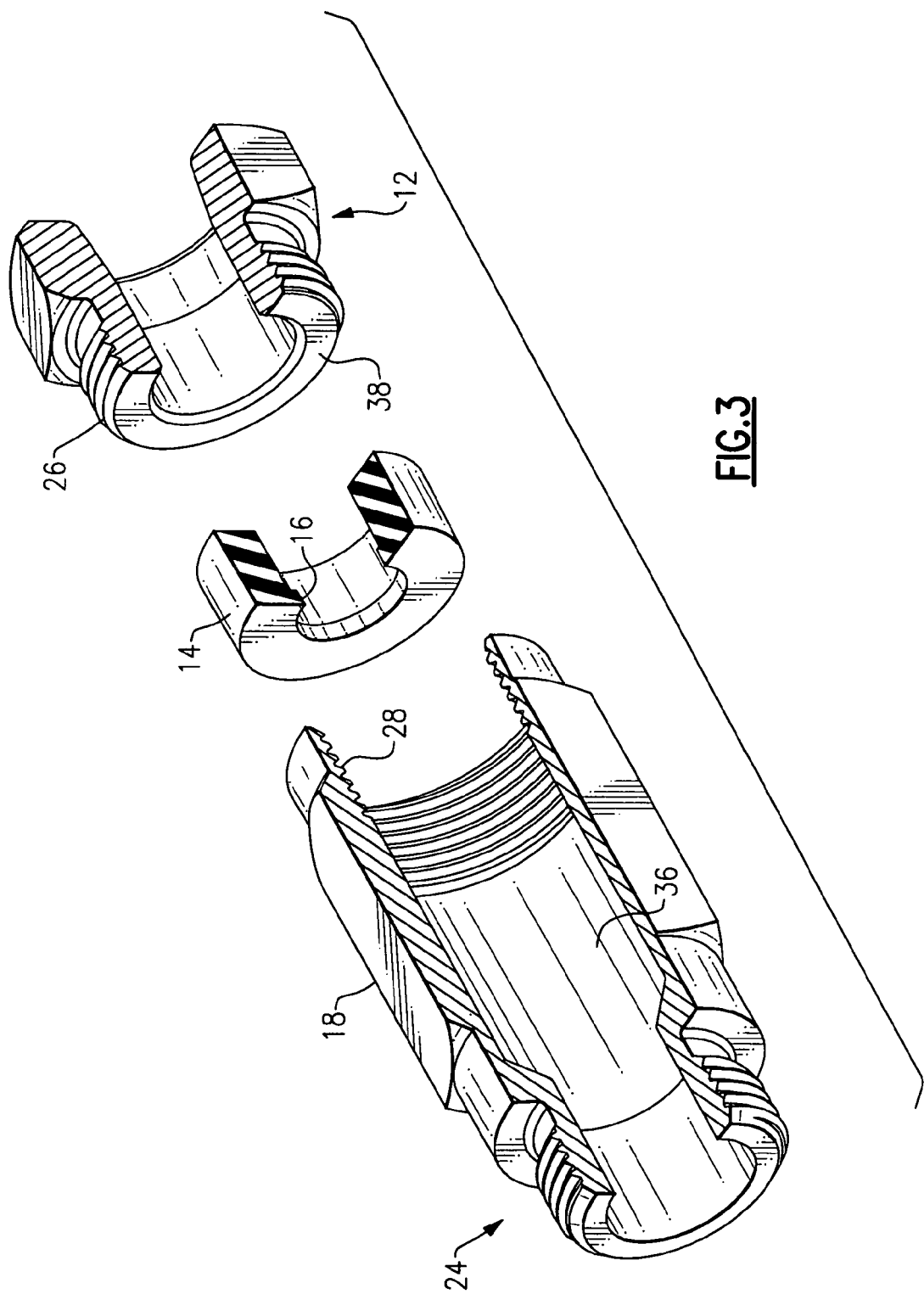
FIG. 3 shows a cutaway exploded perspective view of the embodiment of FIG. 1.

Referring to FIGS. 1–3, a connector 5 includes a body 18 with a threaded connection end 24 which screws into an equipment port or the like. The other end of body 18 includes a plurality of internal threads 28 which engage with a plurality of external threads 26 of a nut 12. A driving surface 38 of nut 12 pushes against a seal 14, forcing seal 14 into body 18. Seal 14 is preferably an elastomeric seal with limited resilience. When the external threads 26 of nut 12 are fully engaged with the internal threads 28 of body 18, seal 14 marks one end of a cavity 36 inside body 18. The other end of cavity 36 is bounded by threaded connection end 24. Seal 14 includes a shoulder 16, the purpose of which is explained below.

Figure 4:
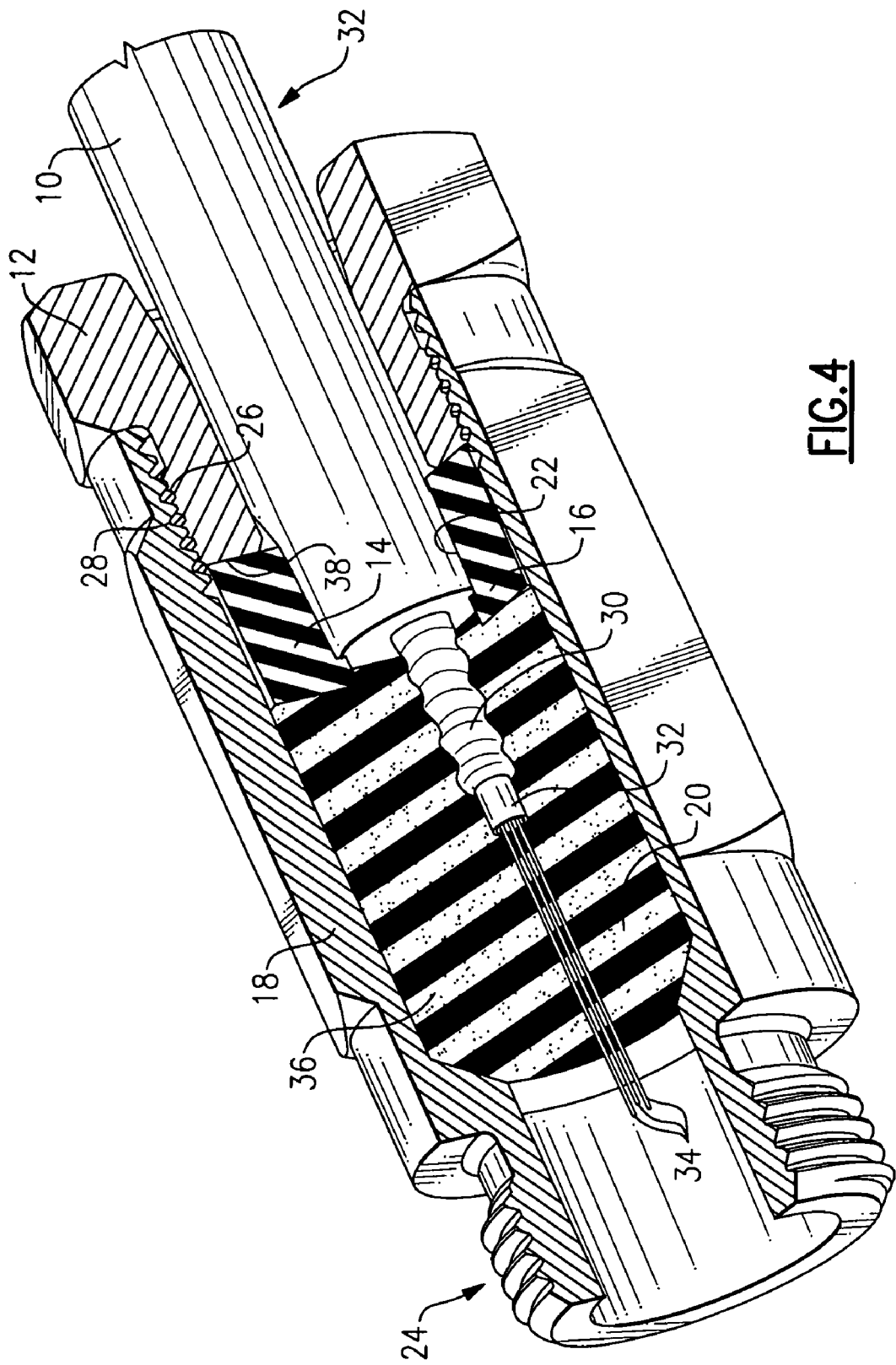
FIG. 4 shows a perspective view of an embodiment of the invention with an epoxy bonded fiberoptic cable installed.

Referring to FIG. 4, a conventional fiberoptic cable 32 is prepared so that a cable sheath 10 is stripped away, leaving an inner armor or sheathing 30 with a plurality of breakout tubes 34 extending from sheathing 30. Cable 32 is inserted through the back of nut 12 and through seal 14 until the unstripped cable sheath 10 abuts shoulder 16 of seal 14, thus registering cable sheath 10 with respect to seal 14. The limited resilience of the materials of seal 14 and cable sheath 10 permits an interference fit, creating a firm, frictional engagement between them. Pressing cable sheath 10 inside seal 14 creates a compressed area 22 in cable sheath 10. Screwing nut 12 onto body 18 forces seal 14 into body 18 the proper distance, which is determined by the distance that break-out tubes 34 should be from the receptors in the equipment port that threaded connection end 24 is screwed into. In addition, in order to have proper sealing, the at least the front edge of the seal must be past internal threads 28 in body 18.

An alternative to nut 12 is a compression fitting using a driving ring such as is described in U.S. patent application Ser. No. 10/686,204 filed Oct. 15, 2003 now U.S. Pat. No. 6,884,113 entitled APPARATUS FOR MAKING PERMANENT HARDLINE CONNECTION, incorporated herein by reference.

One end of pre-form mold 40 includes a seal 42 which passes break-out tubes 34. Alternately, epoxy material 20 is then flowed into cavity 18 through threaded connection end 24. Because seal 14 is in a compressive state around compressed area 22 of cable sheath 10 and within the wall of body 18, no epoxy slips around the outer portion of cable sheath 10 or squeezes between seal 14 and body 18. When epoxy material 20 hardens or cures to a solid state, fiberoptic cable 32 is firmly joined to connector 5.

Figure 5:
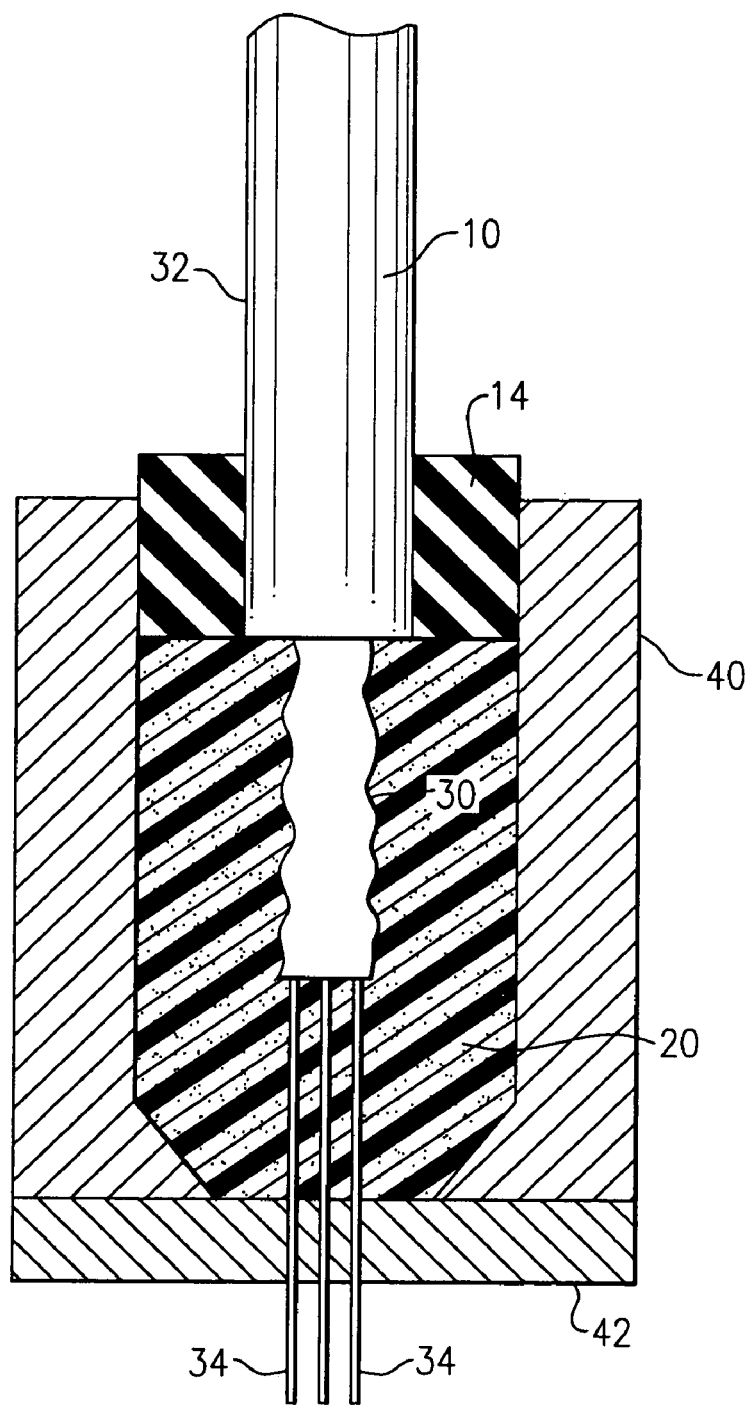
FIG. 5 shows a cross-section view of a pre-form mold used in manufacturing the embodiment of FIG. 1.

Referring also to FIG. 5, in the preferred embodiment seal 14 is placed on fiberoptic cable sheath 10 and slipped back a predetermined distance. Fiberoptic cable 32 is prepared as previously described and then disposed within a pre-form mold 40 with break-out tubes 34 passing through a seal 42. Epoxy 20 is then flowed into pre-form mold 40 and permitted to cure. After curing, the assembly of cable 32, seal 14, and epoxy pre-form 20 are removed as a single piece and inserted into cavity 36 of body 18, after which nut 12 is screwed onto body 18 to hold the assembly within body 18.

Although this embodiment shows a male threaded connection end which connects to a female equipment port, the invention works equally well with a female connection end which connects to a male connector.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A connector device for securing a fiberoptic cable, which cable includes a cable sheath, inner sheathing, and a plurality of break-out tubes, to an equipment port, comprising:

a body of generally cylindrical form having a first section with an inner diameter and a connection portion at a first end of said body;

a seal in said body at a second end of said body defining a cavity between said seal and said connection portion, said seal having an outer diameter slightly greater than said inner diameter of said body such that a compression fit is formed between said seal and said body;

a shoulder disposed on an inner surface of said seal such that said cable sheath abuts said shoulder;

an epoxy material in said cavity surrounding portions of said inner sheathing and said plurality of break-out tubes disposed inside said cavity; and driving means, connected to said second section of said body, for driving said seal into said body.

2. A connector according to claim 1, wherein an inner diameter of said inner surface of said seal is slightly smaller than an outer diameter of said cable such that a compression fit is formed between said inner surface of said seal and said outer diameter of said cable.

3. A connector device according to claim 2, wherein said driving means includes a nut threadingly engaged with said second end of said body, said nut including a driving surface which drives against said seal when said nut is screwed onto said body.

4. A connector device according to claim 1, wherein said driving means includes a nut threadingly engaged with said second end of said body, said nut including a driving surface which drives against said seal when said nut is screwed onto said body.

5. A method of assembling a connector for mounting a fiberoptic cable to an equipment port, wherein a prepared end of said cable includes a jacket, inner sheathing inside said jacket and extending beyond said jacket, and a plurality of break-out tubes inside said inner sheathing and extending beyond said inner sheathing, said method comprising the steps of:

providing a body having a first end connectable to an equipment port and a second end opposite said first end, wherein said body includes a cavity formed therein;

inserting said prepared end of said cable through a seal;

registering said cable sheath against a shoulder of said seal;

disposing said combined seal and at least a portion of said prepared cable end into a pre-form mold;

flowing an epoxy material into said pre-form mold and permitting said epoxy material to harden;

removing an assembly consisting of said seal, said portion of said prepared cable end, and said hardened epoxy material from said pre-form mold;

disposing said assembly through a second end of said body into said cavity; and securing said assembly in said body.

6. A method according to claim 5, wherein the step of securing includes forming a compression fit between an inner surface of said seal and an outer diameter of said cable.

7. A method according to claim 6, wherein the step of securing includes screwing a nut threadingly engaged with said body, wherein said nut includes a driving surface which drives against said seal when said nut is screwed onto said body.

8. A method according to claim 5, wherein the step of securing includes screwing a nut threadingly engaged with said body, wherein said nut includes a driving surface which drives against said seal when said nut is screwed onto said body.

9. A method of assembling a connector for mounting a fiberoptic cable to an equipment port, wherein a prepared end of said cable includes a jacket, inner sheathing inside said jacket and extending beyond said jacket, and a plurality of break-out tubes inside said inner sheathing and extending beyond said inner sheathing, said method comprising the steps of:

providing a body having a first end connectable to an equipment port and a second end opposite said first end, wherein said body includes a cavity formed therein;

mounting a seal within said second end of said body;

inserting said prepared end of said cable through said seal such that said inner sheathing is contained within said cavity;

registering said cable sheath against a shoulder of said seal;

forcing said seal a predetermined distance into said body, whereby said prepared end of said cable is properly positioned within said body; and injecting an epoxy material in flowable form through said first end of said body to fill at least a portion of said cavity and covering all of said inner sheathing in said prepared cable end and a portion of said plurality of break-out tubes in said prepared cable end, wherein said cable is bonded to said connector when said epoxy material hardens.

10. A method according to claim 9, wherein the step of forcing includes forming a compression fit between an inner surface of said seal and an outer diameter of said cable.

11. A method according to claim 10, wherein the step of forcing includes screwing a nut threadingly engaged with said body, wherein said nut includes a driving surface which drives against said seal when said nut is screwed onto said body.

12. A method according to claim 9, wherein the step of forcing includes screwing a nut threadingly engaged with said body, wherein said nut includes a driving surface which drives against said seal when said nut is screwed onto said body.

* * * * *